(12) United States Patent
Olsen

(10) Patent No.: US 11,647,303 B2
(45) Date of Patent: *May 9, 2023

(54) ANTI-ECLIPSE CIRCUITRY WITH TRACKING OF FLOATING DIFFUSION RESET LEVEL

(71) Applicant: Micron Technology, Inc., Boise, ID (US)

(72) Inventor: Espen A. Olsen, Irvine, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,446

(22) Filed: Jan. 19, 2022

(65) Prior Publication Data

US 2022/0150426 A1   May 12, 2022

Related U.S. Application Data

(60) Continuation of application No. 16/653,605, filed on Oct. 15, 2019, now Pat. No. 11,245,862, which is a
(Continued)

(51) Int. Cl.
*H04N 5/359* (2011.01)
*H04N 5/365* (2011.01)
(Continued)

(52) U.S. Cl.
CPC ........... *H04N 5/3598* (2013.01); *H04N 5/361* (2013.01); *H04N 5/3653* (2013.01); *H04N 5/3742* (2013.01)

(58) Field of Classification Search
CPC .... H04N 5/3598; H04N 5/361; H04N 5/3653; H04N 5/3742
See application file for complete search history.

(56) References Cited

U.S. PATENT DOCUMENTS 5,523,570 A   6/1996  Hairston
6,175,383 B1  1/2001  Yadid-Pecht et al.
(Continued)

FOREIGN PATENT DOCUMENTS

CN   1534793 A    10/2004
EP   1840969 A1   10/2007
(Continued)

OTHER PUBLICATIONS

Office Action with Translation for Chinese Patent Application No. 200680015581.X dated Aug. 28, 2009, 17 pages.
(Continued)

*Primary Examiner* — Amy R Hsu
(74) *Attorney, Agent, or Firm* — Perkins Coie LLP

(57) ABSTRACT

Imagers and associated devices and systems are disclosed herein. In one embodiment, an imager includes a pixel array and control circuitry operably coupled to the pixel array. The pixel array includes an imaging pixel configured to produce a reset signal and a non-imaging pixel configured to produce a nominal reset signal. The control circuity is configured to produce an output signal based at least in part on one of (a) the nominal reset signal when distortion at the imaging pixel exceeds a threshold and (b) the reset signal when distortion does not exceed the threshold.

20 Claims, 8 Drawing Sheets

Related U.S. Application Data continuation of application No. 16/147,990, filed on Oct. 1, 2018, now Pat. No. 10,462,399, which is a continuation of application No. 15/803,690, filed on Nov. 3, 2017, now Pat. No. 10,122,952, which is a division of application No. 14/936,449, filed on Nov. 9, 2015, now Pat. No. 9,838,624, which is a continuation of application No. 14/038,277, filed on Sep. 26, 2013, now Pat. No. 9,185,315, which is a continuation of application No. 13/029,613, filed on Feb. 17, 2011, now Pat. No. 8,547,462, which is a division of application No. 11/100,429, filed on Apr. 7, 2005, now Pat. No. 7,916,186.

(51) Int. Cl.
*H04N 5/361* (2011.01)
*H04N 5/374* (2011.01)

(56) References Cited

U.S. PATENT DOCUMENTS

| | | | |
|---|---|---|---|
| 6,288,797 B1 | 9/2001 | Ueno | |
| 6,452,152 B1 | 9/2002 | Yang | |
| 6,774,941 B1 | 8/2004 | Boisvert et al. | |
| 6,806,901 B1 | 10/2004 | Mukherjee et al. | |
| 6,816,196 B1 * | 11/2004 | Mann | H04N 5/3575 348/241 |
| 7,075,474 B2 | 7/2006 | Yamagata et al. | |
| 7,098,950 B2 | 8/2006 | Yamamoto et al. | |
| 7,170,556 B2 | 1/2007 | Kokubun et al. | |
| 7,280,140 B2 | 10/2007 | Henderson | |
| 7,304,674 B2 | 12/2007 | Mentzer et al. | |
| 7,385,636 B2 | 6/2008 | Xu | |
| 7,423,680 B2 | 9/2008 | Han | |
| 7,477,298 B2 * | 1/2009 | Lee | H04N 5/3598 348/241 |
| 7,777,783 B1 | 8/2010 | Chin et al. | |
| 7,782,361 B2 | 8/2010 | Kotake et al. | |
| 7,916,186 B2 * | 3/2011 | Olsen | H04N 5/3598 348/241 |
| 8,547,462 B2 | 10/2013 | Olsen | |
| 9,185,315 B2 | 11/2015 | Olsen | |
| 9,838,624 B2 | 12/2017 | Olsen | |
| 10,122,952 B2 | 11/2018 | Olsen | |
| 10,462,399 B2 | 10/2019 | Olsen | |
| 2001/0028392 A1 * | 10/2001 | Yamamoto | H04N 5/3745 348/207.99 |
| 2002/0149679 A1 | 10/2002 | Deangelis et al. | |
| 2003/0002093 A1 * | 1/2003 | Hynecek | H04N 5/3653 348/E3.021 |
| 2003/0020100 A1 | 1/2003 | Guidash | |
| 2003/0080279 A1 | 5/2003 | Afghahi | |
| 2003/0179159 A1 | 9/2003 | Ohsawa et al. | |
| 2004/0032626 A1 | 2/2004 | Rossi | |
| 2004/0036783 A1 * | 2/2004 | Barna | H04N 5/3598 348/E5.08 |
| 2004/0155973 A1 * | 8/2004 | Bea | H04N 5/3575 348/308 |
| 2005/0168607 A1 * | 8/2005 | Han | H04N 5/3575 348/308 |
| 2005/0206548 A1 | 9/2005 | Muramatsu et al. | |
| 2005/0237400 A1 * | 10/2005 | Blerkom | H04N 5/378 348/E5.079 |
| 2006/0044414 A1 * | 3/2006 | Lee | H04N 5/3598 348/230.1 |
| 2006/0256220 A1 * | 11/2006 | Rysinski | H04N 5/3598 348/308 |
| 2007/0091193 A1 | 4/2007 | Phan et al. | |
| 2007/0188641 A1 * | 8/2007 | Jang | H04N 5/3598 348/308 |
| 2007/0195179 A1 * | 8/2007 | Glenn | H01L 27/14601 348/222.1 |
| 2009/0268063 A1 * | 10/2009 | Ellis-Monaghan | H04N 5/361 348/E9.037 |
| 2011/0133057 A1 | 6/2011 | Olsen | |
| 2014/0022429 A1 | 1/2014 | Olsen | |
| 2015/0116533 A1 * | 4/2015 | Hsu | H04N 5/361 348/223.1 |
| 2016/0065868 A1 | 3/2016 | Olsen | |
| 2018/0063452 A1 | 3/2018 | Olsen | |
| 2019/0045148 A1 | 2/2019 | Olsen | |
| 2020/0045254 A1 | 2/2020 | Olsen | |

FOREIGN PATENT DOCUMENTS

| | | |
|---|---|---|
| JP | 10164442 A | 6/1998 |
| JP | 2000287131 A | 10/2000 |
| JP | 200124947 A | 1/2001 |
| JP | 2004007394 A | 1/2004 |
| JP | 2004222273 A | 8/2004 |
| JP | 2004320346 A | 11/2004 |
| JP | 2005223908 A | 8/2005 |

OTHER PUBLICATIONS

Office Action with Translation for Korean Patent Application No. 10-2007-7025525 dated May 4, 2009, 31 pages.

* cited by examiner

ANTI-ECLIPSE CIRCUITRY WITH TRACKING OF FLOATING DIFFUSION RESET LEVEL

CROSS-REFERENCE TO RELATED APPLICATIONS

This application is a continuation of U.S. application Ser. No. 16/653,605, filed Oct. 15, 2019, now U.S. Pat. No. 11,245,862; which is a continuation of U.S. application Ser. No. 16/147,990, filed Oct. 1, 2018, now U.S. Pat. No. 10,462,399; which is a continuation of U.S. application Ser. No. 15/803,690, filed Nov. 3, 2017, now U.S. Pat. No. 10,122,952; which is a divisional of U.S. application Ser. No. 14/936,449, filed Nov. 9, 2015, now U.S. Pat. No. 9,838,624; which is a continuation of U.S. application Ser. No. 14/038,277, filed Sep. 26, 2013, now U.S. Pat. No. 9,185,315; which is a continuation of U.S. application Ser. No. 13/029,613, filed Feb. 17, 2011, now U.S. Pat. No. 8,547,462; which is a divisional of U.S. application Ser. No. 11/100,429, filed Apr. 7, 2005, now U.S. Pat. No. 7,916,186; each of which is incorporated herein by reference in its entirety.

TECHNICAL FIELD

The present invention relates generally to pixel architectures for semiconductor imagers. More specifically, the present invention relates to an anti-eclipse system for image sensors.

BACKGROUND

FIG. 1 is an illustration of a conventional four transistor (4 T) pixel 100. The pixel 100 includes a light sensitive element 101, shown as a photodiode, a floating diffusion node C, and four transistors: a transfer transistor 111, a reset transistor 112, a source follower transistor 113, and a row select transistor 114. The pixel 100 accepts a TX control signal for controlling the conductivity of the transfer transistor 111, a RST control signal for controlling the conductivity of the reset transistor 112, and a ROW control signal for controlling the conductivity of the row select transistor 114. The voltage at the floating diffusion node C controls the conductivity of the source follower transistor 113. The output of the source follow transistor 113 is presented at node B when the row select transistor 114 is conducting.

The states of the transfer and reset transistors 111, 112 determine whether the floating diffusion node C is coupled to the light sensitive element 101 for receiving a photo generated charge generated by the light sensitive element 101 following a charge integration period, or a source of pixel power VAAPIX from node A during a reset period.

The pixel 100 is operated as follows. The ROW control signal is asserted to cause the row select transistor 114 to conduct. At the same time, the RST control signal is asserted while the TX control signal is not asserted. This couples the floating diffusion node C to the pixel power VAAPIX at node A, and resets the voltage at node C to the pixel power VAAPIX. The pixel 100 outputs a reset signal Vrst at node B. As will be explained in greater detail below in connection with FIG. 2, node B is typically coupled to a column line 215 (FIG. 2) of an imager 200.

After the reset signal Vrst has been output, the RST control signal is not asserted. The light sensitive element 101 is exposed to incident light and accumulates charges based on the level of the incident light during a charge integration period. After the charge integration period, the TX control signal is asserted. This couples the floating diffusion node C to the light sensitive element 101. Charge flows through the transfer transistor 111 and diminishes the voltage at the floating diffusion node C. The pixel 100 outputs a photo signal Vsig at node B. The reset and photo signals Vrst, Vsig are different components of the overall pixel output (i.e., Voutput=Vrst−Vsig), which is typically processed by an imager 200 (FIG. 2) as explained in greater detail below.

FIG. 2 is an illustration of an imager 200 that includes a plurality of pixels 100, 100' forming a pixel array 201. The pixel array 201 includes an outer region 201a of dark (i.e., non-image) pixels 100' and an inner region 201b of image pixels 100. Due to space limitations the pixel array 201 is drawn as a 4×4 array. One skilled in the art would recognize that in most imagers 200, both the outer 201a and inner 201b regions of the pixel array 201 would ordinarily include many more pixels 100', 100.

The dark pixels 100' are essentially identical to the image pixels 100 (FIG. 1) except they are not used to capture an image. Typically, the light sensitive element 101 of a dark pixel 100' is shielded from incident light. As shown in FIG. 2, dark pixels 100' are also coupled to the column lines 215. In some imagers the outputs produced by the dark pixels 100' are not further processed, while in other imagers the outputs are processed as non-image signals to provide a dark signal level.

The imager 200 also includes row circuitry 210, column circuitry 220, a digital conversion circuit 230, a digital processing circuit 240, and a storage device 250. The imager 200 also includes a controller 260. The row circuitry 210 selects a row of pixels 100, 100' from the pixel array 201. The pixels 100, 100' in the selected row output their reset and pixel signals Vrst, Vsig to the column circuitry 220, via column lines 215. The column circuit 220 samples and holds the reset and pixel signals Vrst, Vsig. For signals that were produced by an image pixel 100, the column circuitry 220 also forms the pixel output (Vrst−Vsig), which is presented to the digital conversion circuit 230 via lines 216. The digital conversion circuit 230 converts the pixel output signals to corresponding digital values, and may include for example, plural analog-to-digital converters. The digital values are then processed by the digital processing circuit 240, which stores the processed values in the storage device 250 (for output). The controller 260 is coupled to the pixel array 201, row circuitry 210, column circuitry 220, digital processing circuit 240, and storage device 250, and provides control signals to perform the above described processing. Signals which are produced from a non-image pixel 100' are either not sampled and held and are not subsequently processed by the digital conversion circuit 230, digital processing circuit 240, nor stored in the storage device 250, or are sampled and held and processed to provide a dark signal level.)

A pixel 100 is susceptible to a type of distortion known as eclipsing. Eclipsing refers to the distortion arising when a pixel outputs a pixel signal corresponding to a dark pixel even though bright light is incident upon the pixel. Eclipsing can occur when a pixel is exposed to bright light, as the light sensitive element 101 can produce a large quantity of photogenerated charge. While the pixel 100 is outputting the reset signal Vrst, a portion of the photogenerated charge produced by the light sensitive element 101 during an ongoing integration period may spill over the transfer transistor 111 into the floating diffusion node C. This diminishes the reset voltage at the floating diffusion node and can causes the pixel 100 to output an incorrect (i.e., diminished voltage) reset signal Vrst. This, in turn, can cause the reset and photo signals Vrst, Vsig to be nearly the same voltage. For example, the photo and reset signals Vrst, Vsig may each be approximately 0 volts. The pixel output (Vrst−Vsig) can therefore become approximately 0 volts, which corresponds to an output voltage normally associated with a dark pixel. Eclipsing is not a concern with respect to the non-image pixels 100' because their light sensitive elements 101 are shielded from incident light.

An anti-eclipse circuit can be used to minimize the effect of eclipsing. For example, since during an eclipse a pixel's reset voltage will tend to drop towards zero volts, an anti-eclipse circuit can monitor the voltage level of the reset signal. If the voltage level drop below a threshold voltage, the anti-eclipse circuit can assume the eclipsing may occur (or is occurring) and then correct the voltage level of the reset signal by pulling the reset level up to a correction voltage, thereby minimizing the eclipse effect.

FIG. 3 is a more detailed illustration of one implementation of the column circuitry 220 of FIG. 2 employing an anti eclipsing circuit. In the column circuitry 220, each column line 215 associated with an image pixel 100 is coupled, via node D, to an anti-eclipse (AE) circuit 310, a load circuit 390, and a sample and hold (SH) circuit 380. Each SH circuit 380 is also coupled, via line 216, to the digital conversion circuit 230 (FIG. 2). The load circuit 390 serves to stabilize the voltage at node D as the reset Vrst and photo Vsig signals travel between a pixel 100 and a load circuit 390 via the column line 215. The SH circuit 380 alternatively samples and holds the voltage at node D as the reset Vrst and photo Vsig signals are transmitted on column line 215 between the pixel 100 and the load circuit 390. The AE circuit 310 functions to minimize the effect of the eclipse distortion by monitoring the voltage at node D when the reset signal Vrst is conducted between the pixel 100 and the load circuit 390. If the voltage at node D drops below a predetermined threshold during the output of the reset signal Vrst, the AE circuit 310 intervenes by clamping the voltage of the reset signal Vrst to a predetermined voltage threshold. In this manner, eclipse distortion is minimized by ensuring that the reset voltage does not fall below the predetermined threshold. In the column circuitry 220, each column line 215 associated with an non-image pixel 100' is just coupled to a corresponding load circuit 390. This implementation corresponds to an imager which does not further process non-image pixels 100', although as previously noted, some imagers may process signals from non-image pixels 100'. As shown in FIG. 3, each AE circuit 310 accepts control signals AE_SHR and AE_Vref. The function of these signals will be explained below in connection with FIG. 4.

FIG. 4 is an illustration of an exemplary implementation of the AE circuit 310. The AE circuit 310 is used to selectively clamp node D to node E, thereby setting the voltage at node D to AE_Vref minus the threshold voltage of transistor 320 (transistor 330 is operating as a switch and should not appreciably affect the voltage level at node D). More specifically, if the pixel is outputting a reset signal and the reset signal level is below a predetermined voltage, the AE circuit 310 clamps the voltage at node D to AE_Vref minus the threshold voltages of transistor 320, thereby minimizing the effect of the eclipse distortion.

More specifically, the AE circuit 310 accepts pixel power VAAPIX at node E, which is coupled to one source/drain of an AE transistor 320. The AE transistor 320 is coupled in series a switch transistor 330, which in turn is coupled in series to node D. An AE threshold voltage AE_Vref is supplied to the gate of the AE transistor 320, while a control signal AE_SHR is supplied to the gate of the switch transistor 320.

The AE_SHR control signal is used to activate the AE circuit 310 by causing the AE transistor 330 to conduct only when the reset signal Vrst is being output by a pixel 100 and sampled by sample and hold circuit 380. The AE_SHR control signal may be, for example, identical to the SHR control signal generated by the control circuit 260 (FIG. 2) to control when the sample and hold circuit 380 (FIG. 3) samples and holds the reset signal Vrst. The AE_SHR control signal may be generated by the control circuit 260 (FIG. 2).

Now also referring to FIG. 5, it can be seen that the AE threshold voltage AE_Vref is generated by a circuit 500 from pixel power VAAPIX. The circuit 500 is typically a resistor based voltage divider which produces the AE threshold voltage AE_Vref from pixel power VAAPIX. In FIG. 5, the AE threshold voltage AE_Vref is controlled by the resistance of resistors 510 and 520. The AE threshold voltage AE_Vref is set to a predetermined level. If the voltage at node D drops below the level of the AE threshold voltage AE_Vref while the switch transistor 330 is conducting, the AE circuit 310 clamps the voltage at node D to AE_Vref minus the threshold voltage of transistor 320.

Thus, in order to provide an anti-eclipse function, the AE threshold voltage AE_Vref must be set at a proper level which corresponds to an offset from the nominal (i.e., not during an eclipse) reset signal voltage level of a pixel. Unfortunately, semiconductor fabrication produces variances in each integrated circuit. Differences associated with, for example, the amount of charge injected to the floating diffusion node C of a pixel during a reset operation, or threshold voltages of transistors, may alter nominal reset signal voltage level, and thus, the ideal voltage level for the AE threshold voltage AE_Vref. While such variances may be corrected by calibrating the voltage level of the AE threshold voltage signal, there is a desire and need for an anti-eclipse circuit which minimizes post manufacturing calibrations.

SUMMARY

Exemplary embodiments of the present invention provide for an anti-eclipse circuit for an imager. The anti-eclipse circuit is formed from pixel circuitry over the same semiconductor substrate as the imaging pixels. More specifically, two adjacent pixel circuits are modified to form an amplifier. One input of the amplifier is adapted to receive a reset signal from one of the pixel circuits while another input is adapted to be set at a predetermined offset voltage from the output of the amplifier. The amplifier is preferably a unity gain amplifier, so that the output of the amplifier is set to a voltage level equal to the predetermined offset from the voltage level of the reset signal.

Since the anti-eclipse circuit is affected by the same fabrication processing conditions as the imaging array pixels and may reliably provide a voltage reference for the anti-eclipse circuit without requiring extensive post fabrication calibration.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION

Figure 1:
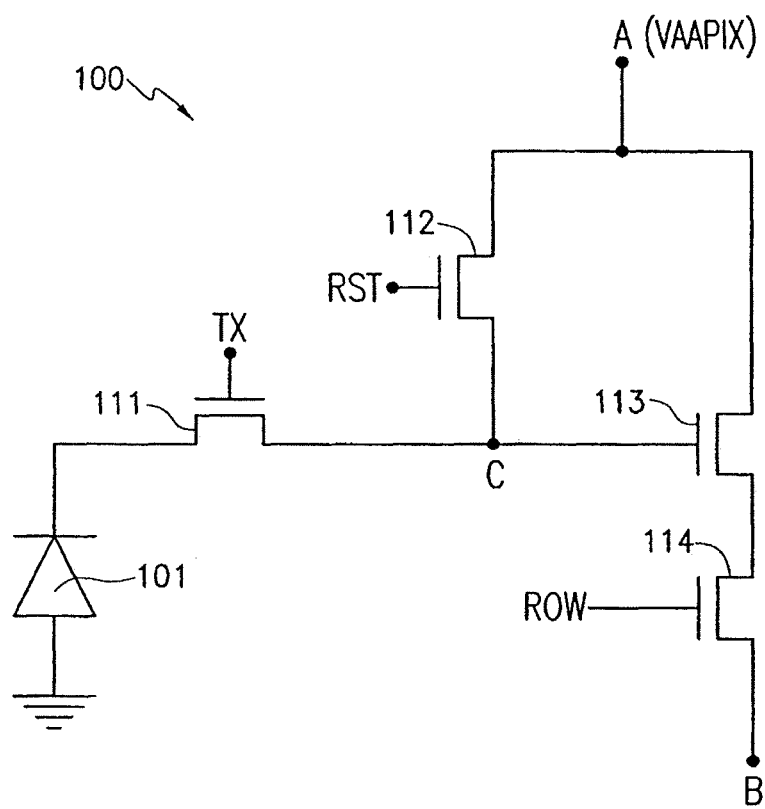
FIG. 1 illustrates a conventional pixel.

Now referring to the drawings, where like reference numerals designate like elements, there is shown in FIG. 6 is an illustration of a circuit 600 for generating the anti-eclipse threshold voltage AE_Vref in accordance with an exemplary embodiment of the invention. The circuit 600 is preferably formed on the same integrated circuit as at least the pixel array 201 and column circuit 220 of an associated imager, but is not otherwise part of the array of pixels generating image signals. The circuit 600 generates the anti-eclipse threshold voltage AE_Vref for each of the anti-eclipse circuits 310 (FIG. 3) of an imager 200. As explained in greater detail below, portions of the circuit 600 are modifications of pixel circuits (e.g., a non-image pixels whose output would not be further processed). By utilizing modified pixel circuits on the same integrated circuit as the pixel array and the column circuit 220, the circuit 600 is subject to the same semiconductor fabrication induced variances as the image pixels 100 of the imager 200, and thus produces an anti-eclipse threshold voltage AE_Vref which can be at a predetermined offset from the reset signal voltage level despite changes to the reset signal voltage level caused by such variances.

The circuit 600 is organized as three overlapping blocks 601, 602, and 603, an offset voltage generator 630, and an optional sample-and-hold circuit 650. The circuit 600 includes three power input node A1, A2, and A3, each for accepting pixel power VAAPIX, and three control signal input nodes X1, X2, and Y, an output signal node Z, and internal nodes C, I+, I−, IL, and OUT, as further described below. Internal node IL is coupled to a load circuit 390'.

Figure 2:
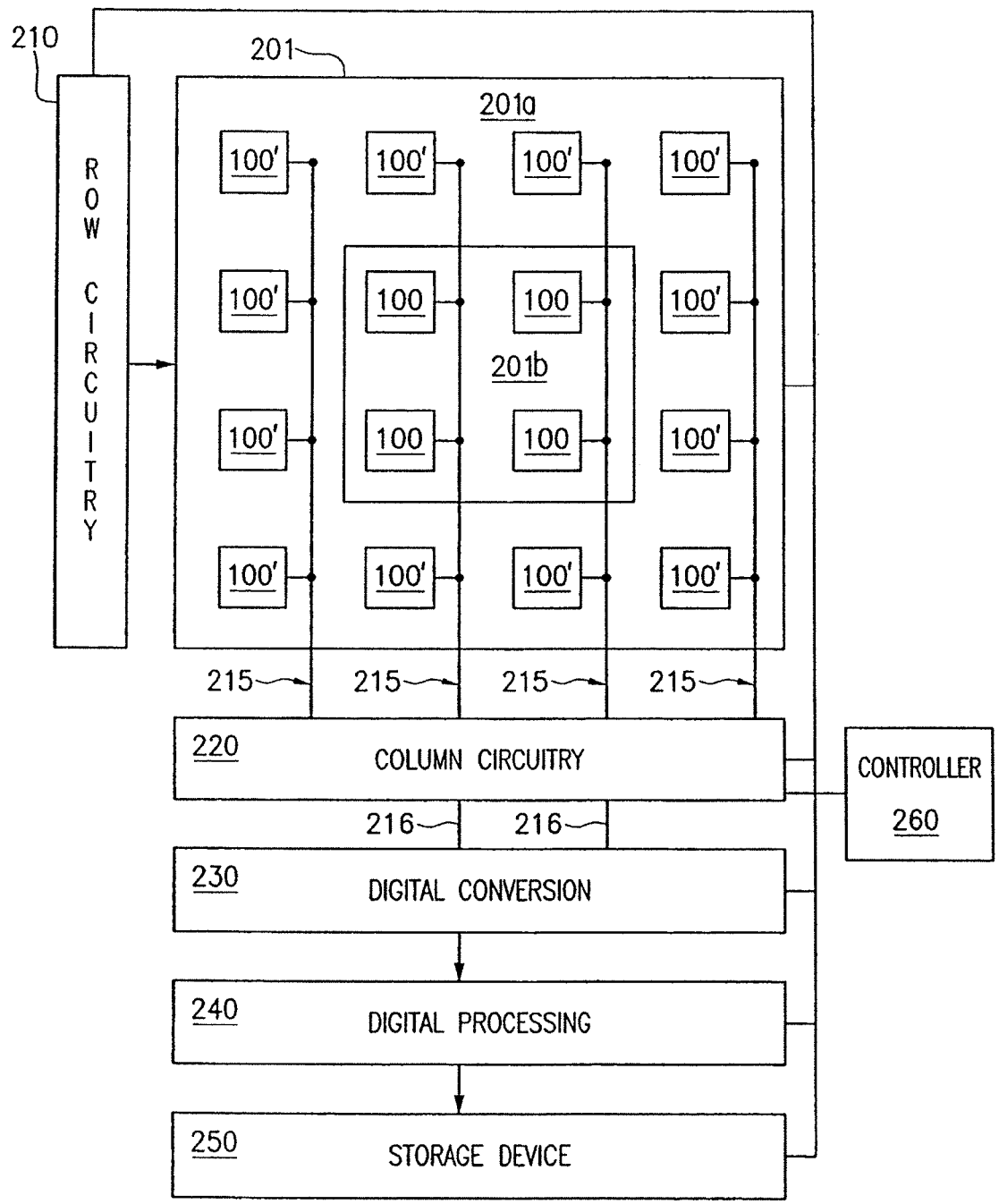
FIG. 2 illustrates an imager utilizing the pixel of FIG. 1.

Block 601 is preferably a modification of a pixel circuit 100 (FIG. 1) used in the imager associated with circuit 600. Block 601 includes the light sensitive element 101 (which may be a photo-diode shielded from incident light when used in circuit 601), N-channel transfer transistor 111, N-channel reset transistor 112, N-channel first source follower transistor 113a, an N-channel first row select transistor 114a, and the floating diffusion node C. The gate of the first source follower transistor 113a corresponds to internal node I+. In circuit 601, the gate of the transfer transistor 111 is permanently coupled to a predetermined voltage that causes the transfer transistor 111 to remain off and not conducting, similar to art imaging pixel operation during a reset operation. In one exemplary embodiment, the gate of the transfer transistor 111 is coupled to a ground potential. Similar to pixel 100, one source/drain of the reset transistor 112 is coupled to pixel power VAAPIX (via node A1) and another source/drain of the reset transistor 112 is coupled to the floating diffusion node C. The gate of the reset transistor 112 corresponds to node Y and is coupled to control signal AE_RST, which is a control signal which follows the state of the RST control signal for the selected row in the pixel array 201 (FIG. 2). The first source follower transistor 113a has its gate coupled to the floating diffusion node C, one source/drain coupled to a source/drain of the row select transistor 114a, and another source/drain coupled to node I1, which receives pixel power VAAPIX via transistor 610 and node A2 of circuit 603. The gate of the first row select transistor 114a is coupled to node X1 to receive control signal AE_ROW, which is a control signal that follows the state of the ROW control signal for the selected row in the pixel array 201. Another source/drain of the first row select transistor 114a is coupled, via node I2, to a load circuit 390'.

The function of the portion of block 601 not shared with block 603 is to provide a signal to node I+. That signal is equivalent to a nominal reset signal produced by a pixel 100 (FIG. 1) of the imager 200 (FIG. 2). More specifically, when control signal AE_RST is asserted high to cause transistors 112 to conduct, the signal flowing between to node I+ from node C is equal to the reset signal produced by a pixel 100 under non-eclipse conditions. This signal does not require calibration because the circuit 601 shares a similar design and is fabricated on the same integrated circuit as the pixels 100 of the imager 200, and thus shares the same semiconductor fabrication inducted variances. Block 601 is not subject to eclipse distortion because its light sensitive element 101 is shielded from incident light.

Block 602 is also preferably a modification of the pixel circuit 100 (FIG. 1) used in the imager 200 associated with the circuit 600. For example, block 602 includes a second N-channel source follower transistor 113b and a second N-channel row select transistor 114b. The transistors 113b and 114b are coupled in series via their source and drains. The gate of the second source follower transistor 113b corresponds to node I−, while the source/drain of the second row select transistor 113b not coupled to the second row select transistor 114b corresponds to node OUT. The gate of the second row select transistor 114b corresponds to node X2. The offset voltage generator 630 is coupled between nodes I− and OUT, and accepts a control signal IN. The offset voltage generator 630 is preferably a digital-to-analog converter having a digital input accepting control word IN, a negative output terminal coupled to node OUT, and an analog output coupled to node I−. The offset voltage generator 630 forces a voltage difference, based on the contents of control word IN, between nodes I− and OUT. The digital word may be supplied by a controller, such as controller 260 (FIG. 2) of the imager 200.

The largest block is block 603, which forms an amplifier in which the positive and negative inputs are respectively applied at terminals I+ and I−, while the output AE_Vref is supplied at node OUT. Node OUT may also be coupled to a sample-and-hold circuit 650, which could be used to present the AE_Vref voltage at the output of the sample-and-hold circuit. Block 603 includes node IL, which is coupled to the source/drains of the first and second row select transistors 114a, 114b. Node IL is also coupled to load circuit 390', which in one exemplary embodiment comprises a transistor 640 biased to flow twice the current of a standard load circuit 390.

Figure 6A:
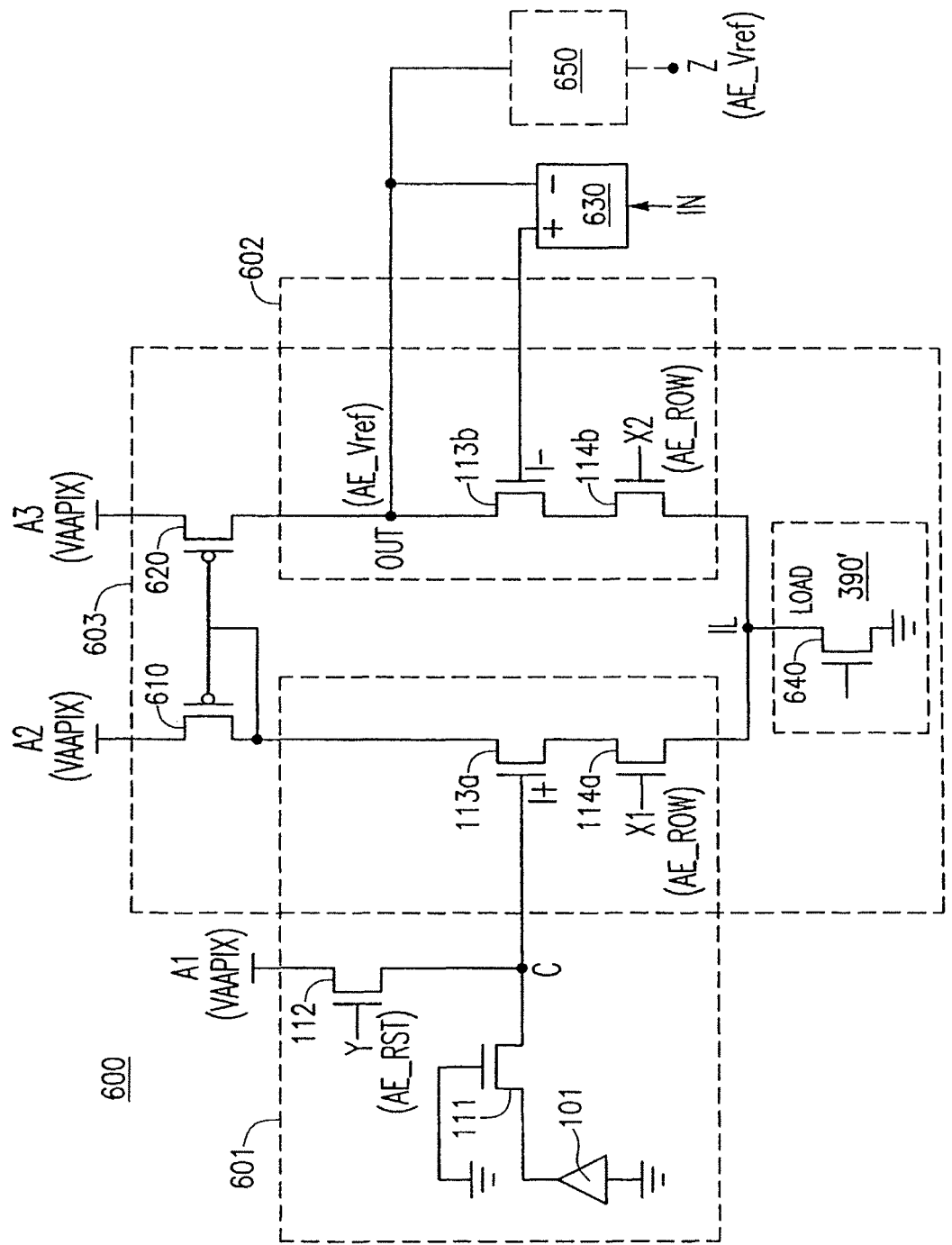
FIG. 6A illustrates a circuit for generating an anti-eclipse threshold voltage in accordance with a first exemplary embodiment of the present invention.
Figure 6B:
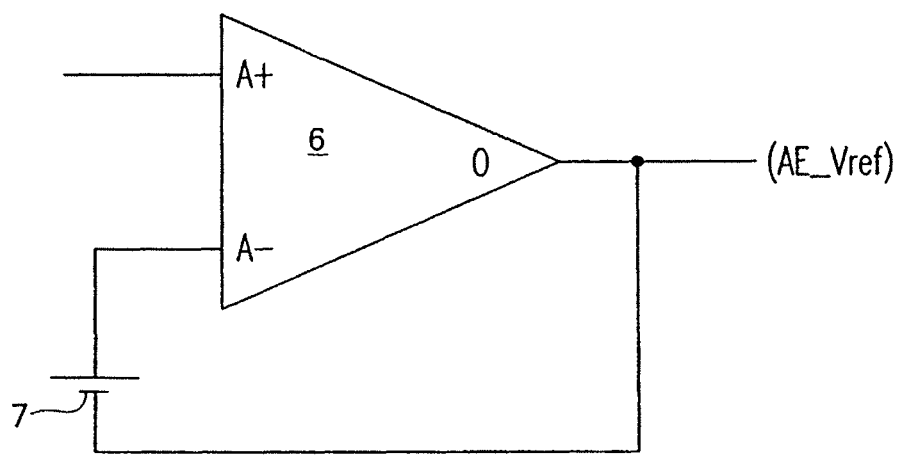
FIG. 6B is a simplified block diagram useful for illustrating the operation of the circuit illustrated in FIG. 6A.

FIG. 6B is a simplified diagram useful for explaining the operation of the circuit 600 of FIG. 6A. FIG. 6B illustrates an amplifier 6 having positive and negative inputs A+, A−, and an output O and a battery 7 for creating an offset voltage.

If a voltage corresponding to a nominal reset signal level is presented to input A+, the amplifier will output at node O a voltage AE_vref which is lower than the nominal reset signal level by the magnitude of the offset voltage created by the battery.

Similarly, in FIG. 6A, the amplifier of block 603 is formed from transistor 610, 620, load circuit 390', and certain portions of two modified pixel circuits 601, 602. The portion of block 601 which does not overlap with block 603 produces the nominal reset signal voltage level. The offset voltage is generated by the offset voltage generator 630. Block 603 produces at node OUT the AE_Vref voltage at a voltage level equal to the VAAPIX voltage level minus the offset voltage created by the offset voltage generator 630.

Figure 3:
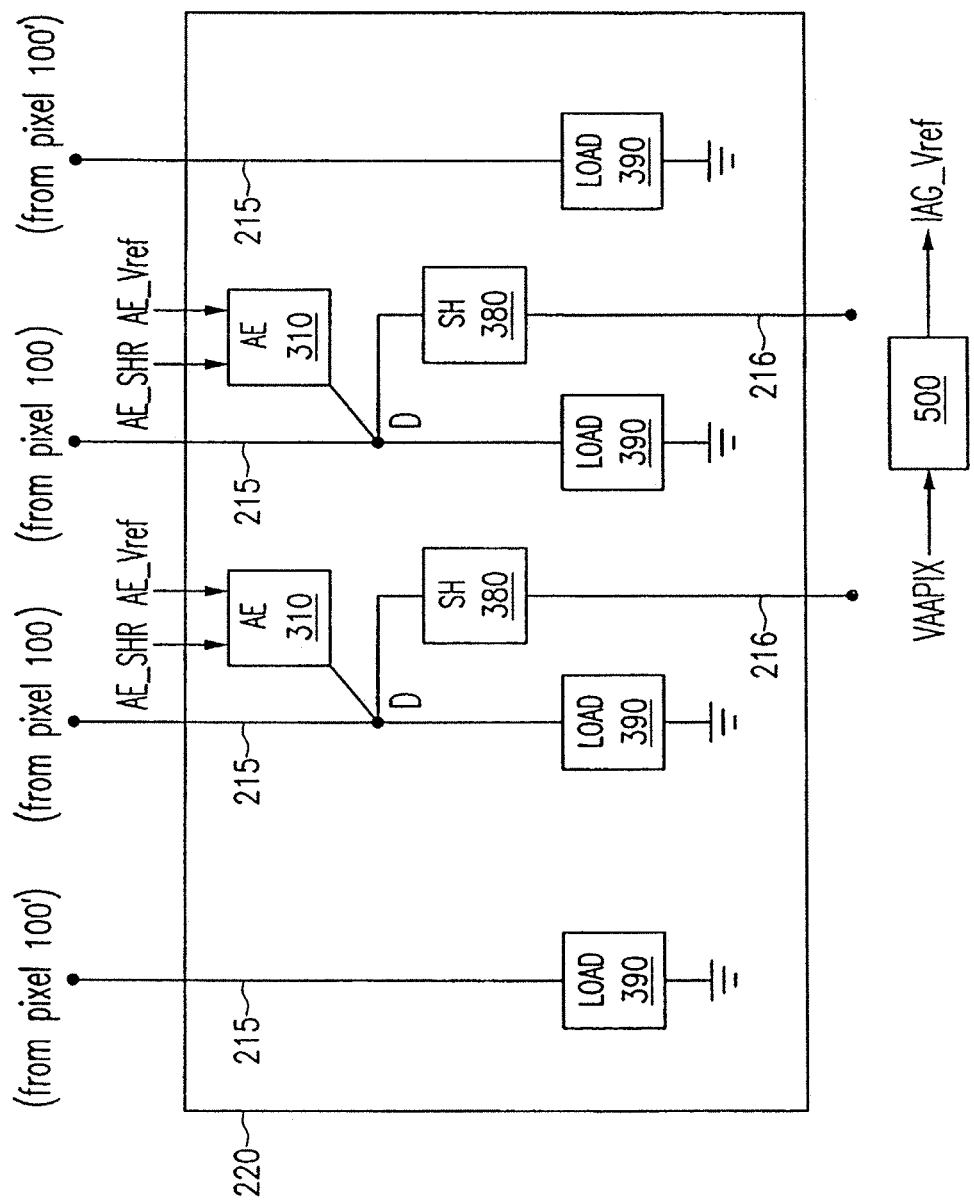
FIG. 3 illustrates column circuitry from the imager of FIG. 2.
Figure 4:
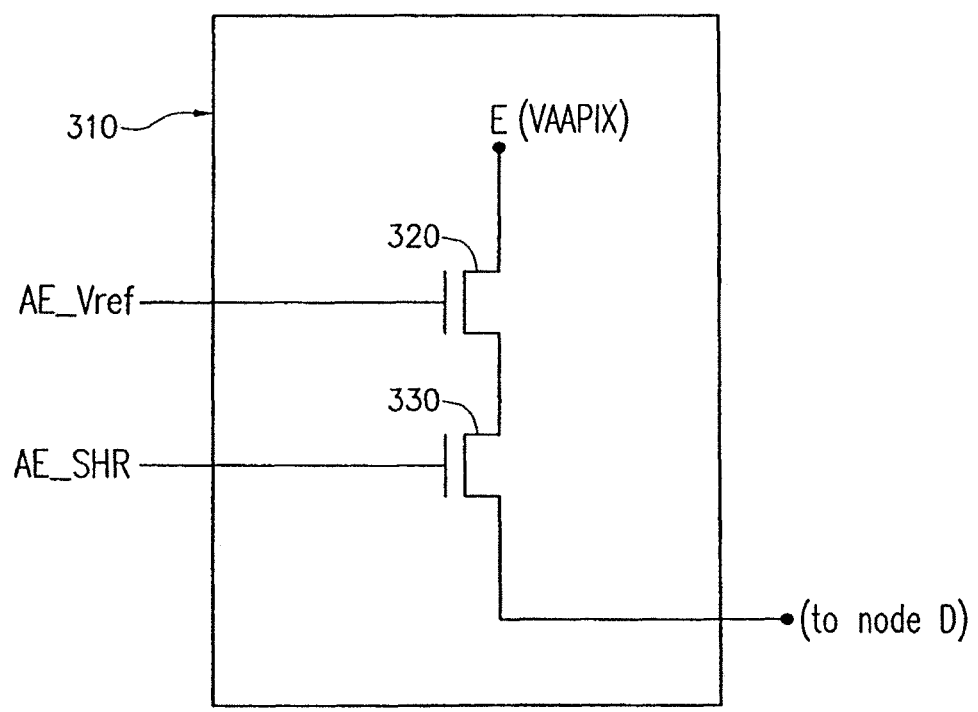
FIG. 4 illustrates an anti-eclipse circuit.
Figure 5:
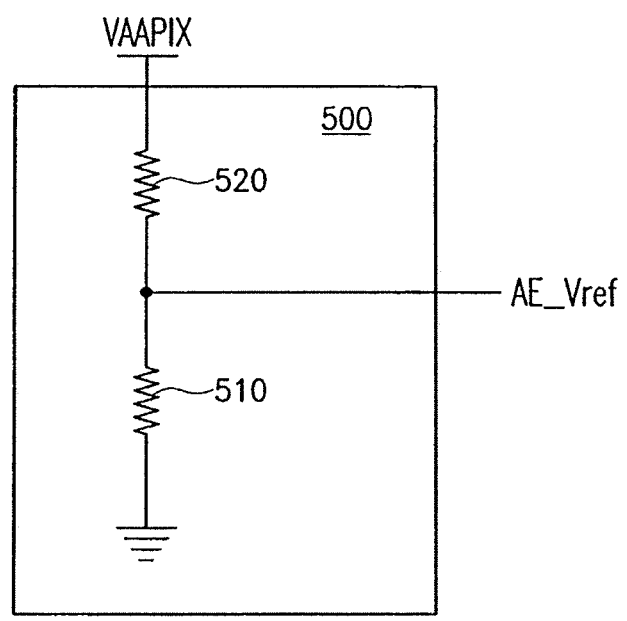
FIG. 5 illustrates a circuit for generating an anti-eclipse threshold voltage.
Figure 7:
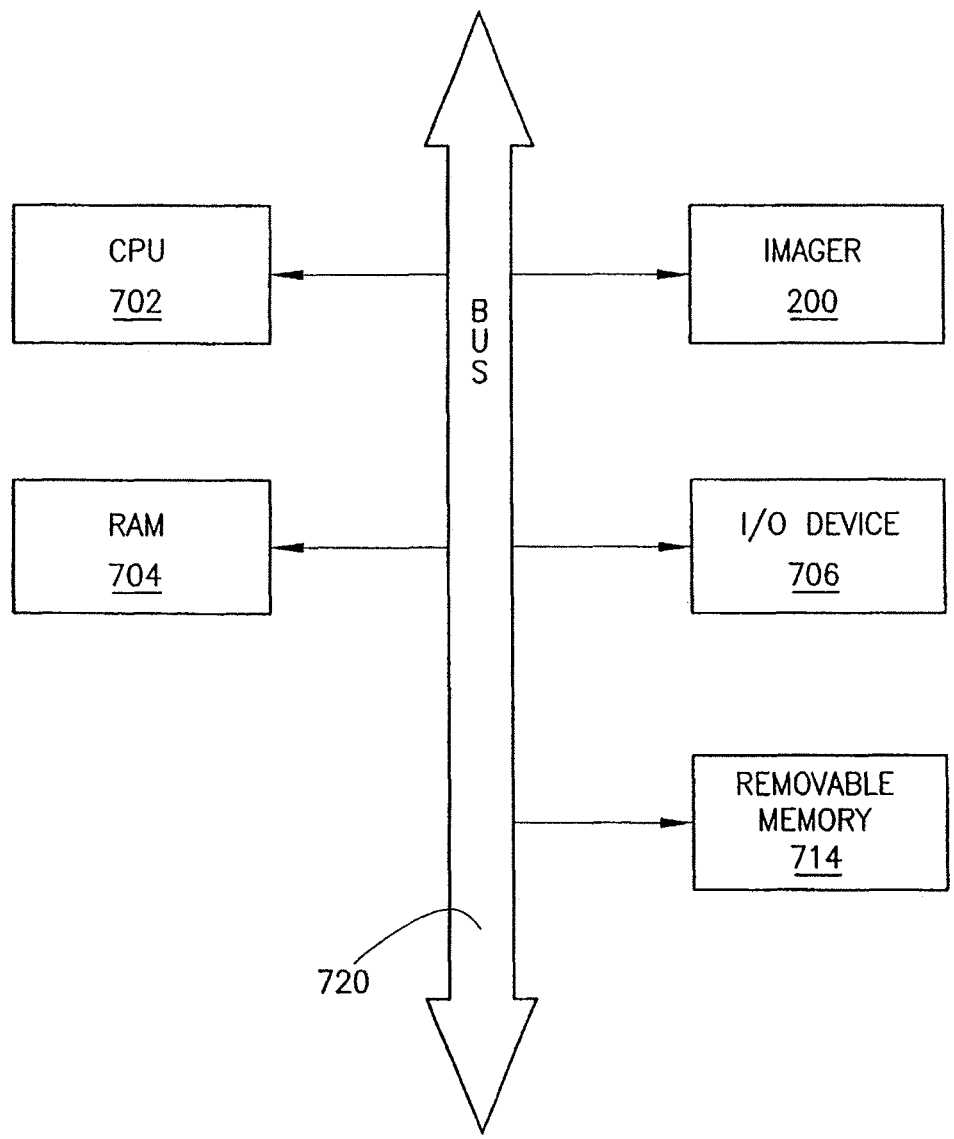
FIG. 7 illustrates a system incorporating the imager having the circuit of FIG. 6.

FIG. 7 illustrates a processor based system 700. The system 700 is exemplary of a digital system having an imaging device. Without being limited, system 700 could be a part of a computer system, camera, scanner, machine vision system, vehicle or personal navigation system, portable telephone with camera, video phone, surveillance system, auto focus system, optical tracking system, image stabilization system, motion detection system, or other system having an imaging function. System 700, for example, a camera, generally comprises a bus 720. Coupled to the bus 720 are a processor, such as CPU 702, a memory, such as a RAM 704, a removable memory 714, an I/O device 706, and an imager 200 including the circuit 600 of the present invention for generating the reference voltage for its anti-eclipse circuits 310 (FIG. 3).

It should be appreciated that other embodiments of the invention include a method of manufacturing the circuit 600. For example, in one exemplary embodiment, a method of manufacturing an anti-eclipse circuit includes the steps of providing, over a portion of a substrate corresponding to a single integrated circuit, at least a plurality of imaging pixels 100, a column circuitry 220, and circuit 600. The pixels 100, column circuitry 220, and circuit 600 can be fabricated on a same integrated circuit using known semiconductor fabrication techniques.

The present invention therefore takes advantage of the likelihood that modified pixel circuits located on the same integrated circuit as the pixels of the pixel array and the column circuitry of an imager would have identical semiconductor fabrication induced process variances. Ideally, a non-imaging pixel is modified to become part of a reference voltage generator. The reference voltage generator is designed to produce a voltage equal to a controllable offset from the ordinary reset signal voltage level of a pixel of the imager, despite differences in such voltage from imager to imager caused by the semiconductor fabrication process.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

I claim:

1. An imager, comprising:
a pixel array comprising a non-imaging pixel,
wherein the imager is configured to:
produce a reference voltage using (a) a nominal reset voltage produced at least in part by the non-imaging pixel and (b) an offset voltage,
determine that the imager is experiencing an eclipsing event, and
improve, based at least in part on the determination and the reference voltage, a quality of an image captured by the imager.

2. The imager of claim 1, wherein a light sensitive element of the non-imaging pixel is shielded from incident light.

3. The imager of claim 1, wherein a gate of a transfer transistor of the non-imaging pixel is permanently coupled to a voltage level such that the transfer transistor remains off and not conducting.

4. The imager of claim 1, wherein, to produce the reference voltage, the imager is configured to apply the offset voltage to the nominal reset voltage.

5. The imager of claim 1, wherein:
the pixel array further comprises an imaging pixel; and
to determine that the imager is experiencing an eclipsing event, the imager is configured to determine that a reset signal voltage produced at least in part by the imaging pixel is below a threshold voltage.

6. The imager of claim 1, wherein:
the pixel array further comprises an imaging pixel; and
to improve the quality of the image captured by the imager, the imager is configured to adjust, based at least in part on the reference voltage, a reset signal voltage produced at least in part by the imaging pixel.

7. The imager of claim 6, wherein the imaging pixel is proximate the non-imaging pixel in the pixel array.

8. The imager of claim 6, wherein the imaging pixel is immediately adjacent the non-imaging pixel in the pixel array or is formed over a same substrate as the non-imaging pixel.

9. The imager of claim 6, wherein, to adjust the reset signal voltage, the imager is configured to pull the reset signal voltage up to a correction voltage.

10. The imager of claim 9, further comprising a sample and hold circuit, wherein the sample and hold circuit is configured to sample and hold the correction voltage at least while the imaging pixel is outputting the reset signal voltage.

11. The imager of claim 1, wherein:
the pixel array further comprises an imaging pixel; and
to improve the quality of the image captured by the imager, the imager is configured to adjust an image signal corresponding to the imaging pixel and to the image such that the image signal does not correspond to a dark pixel in the image at least when bright light is incident upon the imaging pixel.

12. The imager of claim 1, wherein:
the imager further comprises a reference voltage generator;
the reference voltage generator includes:
the non-imaging pixel,
a second pixel having a first source-follower transistor, and
an amplifier;
the non-imaging pixel includes a second source-follower transistor; and
the amplifier is configured to generate the reference voltage based at least in part on (a) a first voltage supplied to a gate of the first source-follower transistor and (b) a second voltage supplied to a gate of the second source-follower transistor.

13. The imager of claim 1, wherein the imager is further configured to generate the offset voltage.

14. A method of operating an imager, the method comprising:
producing a reference voltage using (a) a nominal reset voltage produced at least in part by a non-imaging pixel of the imager and (b) an offset voltage,
determining that the imager is experiencing an eclipsing event, and
improving, based at least in part on the determination and the reference voltage, a quality of an image captured by the imager.

15. The method of claim 14, wherein determining that the imager is experiencing an eclipsing event includes determining that a reset signal voltage produced at least in part by an imaging pixel of the imager is below a threshold voltage.

16. The method of claim 14, wherein improving the quality of the image captured by the imager includes adjusting, based at least in part on the reference voltage, a reset signal voltage produced at least in part by an imaging pixel of the imager.

17. The method of claim 16, wherein adjusting the reset signal voltage includes pulling the reset signal voltage up to a correction voltage.

18. The method of claim 17, further comprising sampling and holing the correction voltage at least while the imaging pixel is outputting the reset signal voltage.

19. The method of claim 14, wherein improving the quality of the image captured by the imager includes adjusting an image signal corresponding to an imaging pixel of the imager and to the image such that the image signal does not correspond to a dark pixel in the image at least when bright light is incident upon the imaging pixel.

20. The method of claim 14, wherein producing the reference voltage includes generating the reference voltage using an amplifier and based at least in part on (a) a first voltage supplied to a gate of a first source-follower transistor of the non-imaging pixel and (b) a second voltage supplied to a gate of a second source-follower transistor of another pixel of the imager.

* * * * *